United States Patent [19]

Dayus

[11] Patent Number: 4,628,954
[45] Date of Patent: Dec. 16, 1986

[54] MULTI-USE DAMPER

[75] Inventor: Lloyd G. Dayus, Mississauga, Canada

[73] Assignee: Rachels Industries, Inc., Memphis, Tenn.

[21] Appl. No.: 717,317

[22] Filed: Mar. 28, 1985

[51] Int. Cl.⁴ .................... F16K 17/38; F16K 31/53
[52] U.S. Cl. ........................................ 137/75; 98/41.1;
 137/79; 137/512.1; 137/601; 137/375;
 251/249.5; 251/291; 251/298; 251/212
[58] Field of Search ................. 137/72, 75, 79, 512.1,
 137/601, 375; 251/212, 249.5, 291, 298;
 98/41.1, 110

[56] References Cited

U.S. PATENT DOCUMENTS

| | | | |
|---|---|---|---|
| 7,713 | 10/1850 | Woodside | 98/113 |
| Re. 28,492 | 7/1975 | Hedrick et al. | 98/41.1 |
| 1,659,880 | 2/1928 | Kauffman | 98/41.2 |
| 2,837,991 | 6/1958 | DeRoo | 98/40.05 |
| 3,074,427 | 1/1963 | Wheeler, Jr. | 137/512.1 |
| 3,076,469 | 2/1963 | Averill | 251/212 |
| 3,147,768 | 9/1964 | Kennedy | 137/614.11 |
| 3,384,112 | 5/1968 | Smith | 137/512.1 |
| 3,592,240 | 7/1971 | Hedrick | 137/316 |
| 3,976,245 | 8/1976 | Cole | 137/601 |
| 4,146,048 | 3/1979 | McCabe | 137/75 |
| 4,445,533 | 5/1984 | DeFrees | 137/512.1 |
| 4,469,132 | 9/1984 | Redington | 137/601 |
| 4,487,214 | 12/1984 | Tatum | 137/601 |

Primary Examiner—George L. Walton
Attorney, Agent, or Firm—George A. Rolston

[57] ABSTRACT

An air damper having a housing, a strut mounted across the housing, a pair of damper panels hinged on the strut, and swingable between open and closed positions, an adjustable control above the strut, and, linkage on the upper side of each panel extending to the control to cause the panels to swing from one position to the other.

6 Claims, 5 Drawing Figures

U.S. Patent Dec. 16, 1986 Sheet 2 of 2 4,628,954
FIG. 3.
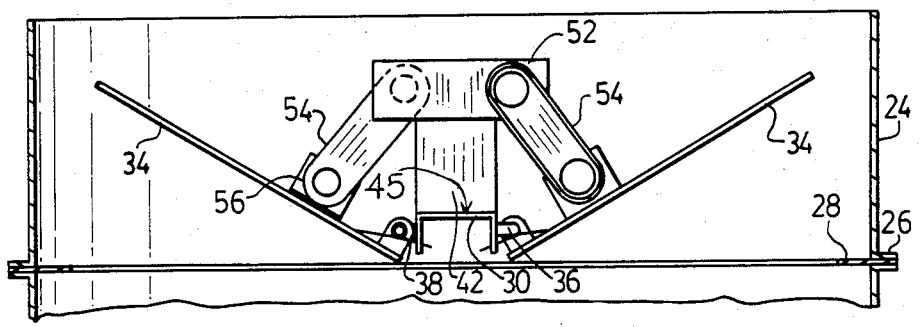
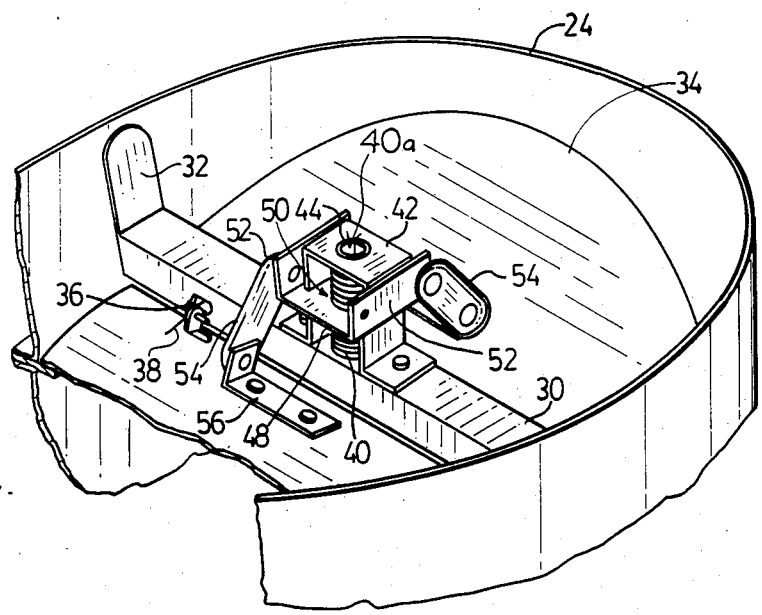
FIG. 4.
FIG. 5.
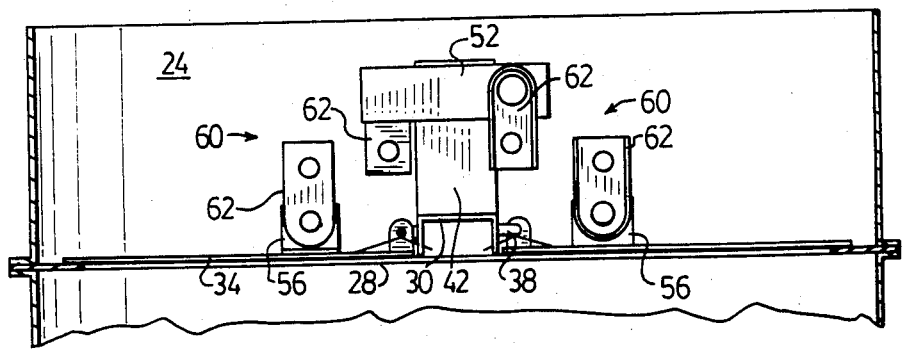

MULTI-USE DAMPER

The invention relates to an air supply damper for location at an air outlet, and incorporating damper adjustment controls, and optionally incorporating heat sensitive means for closing the damper.

BACKGROUND OF THE INVENTION

Air supply outlets such as are used for distributing fresh air in an air circulating system, usually incorporates some form of damper for controlling the flow of air through the outlet. Such air outlets may be of various shapes. When the air outlet is located in the ceiling, particularly of domestic, or office space or commercial space, or the like, a circular form of air distribution outlet is particularly preferred. This form of outlet is usually connected by means of a duct system of generally circular cross section.

The design of a damper for use in a connection with such circular duct and circular outlet, presents certain problems. It must be adaptable to progressively open and close the circular opening, and at the same time it must be accessible from the building space beneath the air outlet and ceiling itself.

One form of such a damper which is particularly suitable for the purpose is shown in U.S. Pat. No. 3,592,240. That patent discloses a damper having two generally semi-circular panels, which are hinged to swing upwardly and downwardly about a central strut.

A worm and linkage, is mounted below the strut, and connects between the strut and the hinged panels.

A suitable tool such as a screwdriver or the like may be inserted to rotate the worm and thus adjust the two panels upwardly and downwardly.

This device works effectively and has proved to be popular and satisfactory.

There are however certain disadvantages with this system. Fire insurance and building code regulations are requiring much higher standards of resistance to heat and fire, particularly in the construction of ceilings in such buildings. A principle area of weakness in such ceilings occurs at each air outlet. The ceiling itself may be constructed of panels which are substantially fireproof or are at least heat resistant for a sufficient length of time to meet the regulations. However, each air outlet constitutes a relatively substantial opening through such ceiling. These openings provide an easy passage way for heat and possible flames, through the ceiling. Thus although the ceiling fabric itself may have the necessary fire rating which substantially negates the effectiveness of the ceiling in a fire situation.

Thus in buildings where the construction code or regulations call for a fire rated ceiling, it is highly desirable to provide some form of automatic fire damper in the ducts immediately above each air outlet. Such fire dampers are sensitive to heat and will close automatically in response to a pre-determined temperature.

Fire dampers of rectangular design are well known in the art. Essentially, all that is required is simply to place a fire damper in the duct above the air outlet and control damper of the type shown in the U.S. Patent referred to above.

In practice however this greatly increases the cost of construction. In addition, the installation time required is much greater than the time required for installation merely of the outlet and control damper itself. A further problem is that the location of a fire damper of conventional construction on top of such an air outlet and a control damper, creates an excessive height above the ceiling. This may in fact interfere with the dead space between the ceiling, and the floor slab of the floor next above in the building.

Most of the existing fire dampers incorporates some form of heat fusible link, and one or more blades which is spring loaded, and is held open by means of such a link. When the link becomes heated, it melts and releases the blades. The blades then snap closed, thereby closing off the duct.

It might at first appear feasible to modify the damper shown in U.S. Pat. No. 3,592,240 to include a spring and a fusible link.

However, in practice it is found that this will not be satisfactory. The location of the worm, and operating linkage on the strut below the level of the panels, causes obstruction on the underside of the panels. The inclusion of some form of heat fusible member in such linkage will therefore present serious difficulties. The linkage will tend to obstruct the closure of the panels, in response to a fire situation.

Nevertheless, it is readily apparent that if the control damper can also be used as a fire damper, there would be substantial economies achieved in the cost of materials and also even greater economies is the cost of installation. In addition, the problems of obstructing the dead space between the ceiling and the floor slab will also be eliminated.

On the other hand, in providing such a multi-mode damper, it is essential to avoid increasing the cost to the point where when it is used merely as a control damper it has a cost greater than prior art control dampers.

It is therefore desirable to provide a control damper, which may be used as a fire damper, where building regulations have this requirement, and which may be used as a control damper, where this requirement is not present.

BRIEF SUMMARY OF THE INVENTION

The invention seeks to overcome the forgoing disadvantages, by the provision of an air control damper for use in association with an air outlet, having an opening of predetermined dimensions, and comprising a strut member adapted to be mounted in a generally transverse manner across the center of such opening, a pair of damper panels hingedly mounted on said strut, and swingable between upright open positions, and generally horizontal closed positions, adjustable movement means mounted above said strut, and operable by means of a tool, opening means in said strut for access of such tool therethrough, whereby said movement means may be operated from beneath the said opening, linkage means on the upper side of each said panel extending from said panels to said movement means may cause said panels to swing from one position to the other.

More particularly, the invention seeks to provide such a control damper wherein the linkage means incorporate at least one link for each said panel, such link being formed of heat fusible metal, and spring means for each such panel urging same to swing into its generally horizontal closed position, upon melting of said link.

More particularly, it is an objective of the invention to provide such a control damper, including thermal barrier means bonded to the upper surfaces of each said panel, whereby to resist transfer of heat therethrough and prolong the fire rating.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is a section along the line 3—3 of FIG. 2.

FIG. 4 is an enlarged perspective of the operating mechanism of the damper, and, FIG. 5 is a section corresponding to FIG. 3 shown after release of the heat fusible link.

DESCRIPTION OF A SPECIFIC EMBODIMENT

Figure 1:
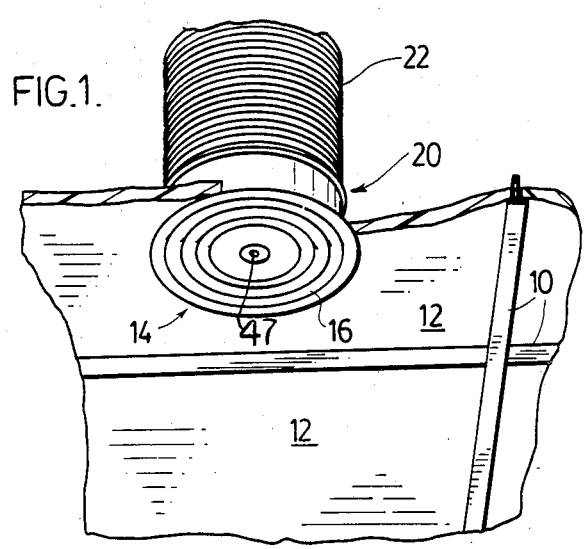
FIG. 1 is a lower perspective of a ceiling partially cut away to reveal the damper according to the invention.

As best shown in FIG. 1, a typical ceiling is shown which comprises a rectangular frame work of grid of ceiling Tees, suspended from the concrete floor slab, or roof structure of a building. Such ceiling Tees are shown generally as 10, and are well known in the art. Typically, accoustic panels 12 are layed on the ceiling Tees, to provide the completed ceiling fabric.

It will of course be appreciated however, that the invention is not limited to such a tile ceiling. Many other forms of ceiling structure are available some of which are simply strips of coated sheet metal. Ceilings may also be formed of plaster wall board, or plaster material in a wide variety of different ways and finishes. The invention is not restricted to any particular form of ceiling.

In order to provide air distribution throughout the building space, air outlets are usually provided in the ceiling at regular intervals. Such air outlets are shown generally as 14. Air outlets may take a number of different forms. In this invention, the air outlets are shown in the form of circular openings in the ceiling which are provided with circular air distributor blades 16. The blades are adjustable up and down, so as to vary the air distribution pattern in the building space.

In order to equalize air distribution at all of the air flow outlets, it is the practise to provide an air flow damper in the ductwork above the opening. The damper must be capable of being adjusted from beneath the ceiling, by a maintenance man, or by persons occupying the space, so that they may insure their own personal comfort. In this form of air distribution system, the air ducts in the space above the ceiling are usually flexible cylindrical tubular members. Accordingly. it is desirable that the dampers shall also be of a generally cylindrical design.

One form of a damper which has proved to be satisfactory in the past in this type of situation is shown in U.S. Pat. No. 3,592,240.

For the purposes of describing FIG. 1, it will thus be seen that the air distributor 14 which is mounted in the ceiling itself is connected to an air damper shown generally as 20 which is located immediately above it, and this in turn is connected to a flexible air duct 22, which connects with the air distribution system provided in the building. Such air distribution system and duct form no part of this invention and are accordingly not described herein. They are in any event subject to wide variation and are well known in the art.

Referring now to FIGS. 2 to 6, the damper 20 according to the invention will be seen to comprise a generally cylindrical housing 24, which in this embodiment is formed in two halves, each half having an annular lip 26. Between the two annular lips 26, an annular sealing ring 28 is fitted, which extends inwardly into the interior of the housing 24.

Housing 24 defines an upstream end 24a and a downstream end 24b, and air flows, namely, from 24a to 24b.

Spanning the diameter of the interior of housing 24 is a cross member or strut 30, which is attached at either end by means of brackets 32 to the interior of housing 24.

Two generally semi-circular damper panels 34—34 are hinged by hinge tongues 36, to the sides of member 30. Springs 38 engaging between channels 30 and panels 34 urge panels 34 into a normally horizontal closed position, in which they contact ring 28.

In this way, panels 34—34 can completely close off housing 24.

This will therefore obstruct all air flow from the duct to the air outlet 14.

In order to regulate and control the air flow, provision is made for the adjustable movement of panels 34 so that they may be positioned at any angular position between their upstream open position and their transverse closed position.

Such adjustment means will be seen best in FIG. 4 and comprises an elongated worm gear 40, mounted centrally on the upper side of cross member 30, and supported at its lower end on such cross member. The upper end of the worm 40 is mounted in a hat shaped bracket 42, which is fastened to the cross member 30 on either side of the worm 40, and provides a further journal 44 for the upper end of the worm 40.

The worm 40 has a central opening 40a for receiving a tool 46. The central opening will have some form of key way (not shown) by means of which torque from the tool can be transmitted to the worm.

A tool opening 45 is also provided through member 30, to permit the tool to be inserted from below, through passage 47, in air distributor 14.

A plate member 48 has a central opening 50, which fits around the worm. The opening 50 is formed in such a way that it engages the threads of the worm. The plate member is dimensioned so that its side edges ride inside the hat shaped bracket. Thus when the worm is rotated, the plate member is driven either up or down the worm, and its held against rotation by means of the hat shaped bracket.

On either side of the plate member 48, a connecting bracket 52 extends outwardly with respect to the hat-shaped bracket, and is bent upwardly generally perpendicular to the plate.

Each of the brackets 52 is pivotally connected to a connecting link 54. Each link 54 is in turn connected by means of an attachment bracket 56 to respective panels 34, also in a pivotal manner.

Each of the panels is thus operated and controlled by means of the worm and plate member. As the worm is rotated to force the plate member upwardly the panels will swing upwardly thereby opening the damper. As the worm is rotated in the opposite direction the plate member will move downwardly thereby swinging the panel down in to their closed position.

By suitably adjusting the worm, the air flow through the damper can be balanced with respect to other dampers and air outlets in any building space.

Where this is the only action or function that is required of the damper, then the links 54 may simply be one piece members stamped out of sheet metal such as steel.

In this case, the damper will simply function as a damper, and will not function as a fire damper in an emergency.

However, where it is desired to provide an emergency fire damper mode of opertion, then the links 54 may be replaced by heat fusible link members 60 (FIG. 5). Links 60 are well-known for use in other applications, such as the operation of emergency fire extinguishers and the like. They are of a variety of different designs. Typically, there will be two link portions 62, bonded by fusible metal typically of some low temperature melting alloy such as white metal or the like.

When subjected to a predetermined elevated temperature such as might arise in an emergency, the fusible metal melts, allowing the two link portions to separate.

Where this action takes place in the present invention, the springs 38 will then immediately urge the panels 34 to swing into their closed position thereby shutting off the damper.

It will clearly be seen that movement of the two panels, under the influence of such springs, causes the two link portions of the two fusible links, to fly apart, and the two panels are free to close without obstruction by the link members or any other associated mechanism.

This advantage is a result of locating the worm, and plate and bracket above the cross-member 30, and is the result of locating the entire operating linkage for the panels on the upstream side of the panels.

Figure 2:
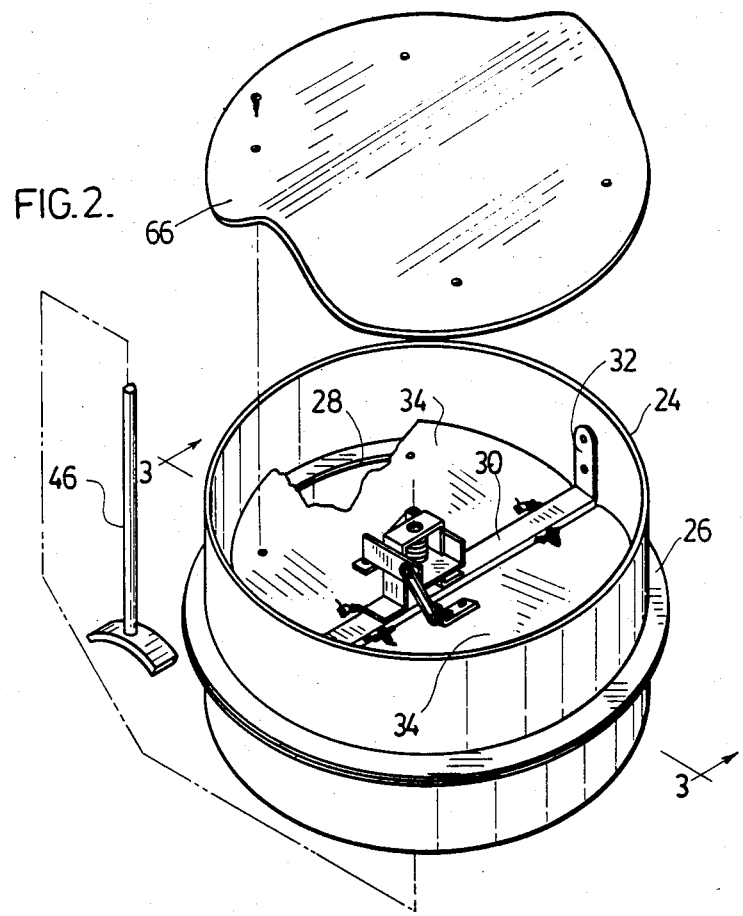
FIG. 2 is a perspective illustration partially exploded and cut away, showing a damper according to the invention.

It will thus be seen that by the use of the invention a multi mode damper is provided, in which in one mode a simple air control damper function is provided, and in the other mode, an air control damper and fire damper mode of operation is provided. The change over from one mode of operation to the other is achieved merely by substituting one form of link for the other without in any way changing any of the tooling or any of the other parts required.

Where an extended fire rating is desired, a thermal barrier panel 66 may be loosely attached to panels 34—34 as shown in FIG. 2.

The panel 66 is of flexible heat resistant felt-like material. It fits loosely over the panels 34, and also the cross member 30 and operating mechanism 50. It will be flexible enough to permit normal operation of the panels 34 for adjustment, and will not impede emergency closure as described.

In this way a fully flexible design is provided, having a broad sales appeal in a variety of different functions.

The foregoing is a description of a preferred embodiment of the invention which is given here by ways of example only. The invention is not to be taken as limited to any of the specific features as described, but comprehends all such variations thereof as come within the scope of the appended claims.

What is claimed is:

1. An air control damper for use in association with an air supply and an air outlet and comprising:
    a housing defining upstream and downstream portions, and a flow axis;
    supply connection means on said upstream portion adapted for connection to said air supply;
    a strut member mounted in a generally transverse manner across said housing;
    a pair of damper panels having upstream and downstream sides and hingedly mounted on said strut member, and swingable between an upstream open position located in said upstream portion of said housing, and a generally transverse closed position obstructing said flow axis and defining a closure plane located between said upstream and downstream portions of said housing;
    spring means engaging said damper panels and urging same to close;
    adjustable movement means mounted on said strut member and located in said upstream portion of said housing, and,
    a pair of attachment brackets on the upstream side of said damper panels having respective pivot openings; a pair of link openings on said adjustable movement means; a pair of fusible links pivotally connected between said respective pivot openings and said respective link openings, whereby to cause said panels to swing from one position to the other in response to said movement means.

2. An air control damper as claimed in claim 1 including an opening in said strut member, extending from said movement means to said downstream portion of said housing, and providing tool access to said movement means from said downstream portion of said housing.

3. An air control damper as claimed in claim 1, including a sealing flange located in said housing, adjacent the location of said damper panels when the same are in their transverse closed position.

4. An air control damper as claimed in claim 1 wherein said movement means is located between said damper panels, when the same are swung into their upstream open positions.

5. An air control damper as claimed in claim 1 wherein the linkage means incorporate at least one thermal link for each said panel, said thermal link being formed of a metal responsive to elevated temperatures resulting from an emergency condition, and spring means for each said panel urging the same to swing into its generally transverse closed position, said link being adapted to melt, upon being subjected to heat from an emergency condition, and releasing said panel, for swinging in response to said spring means.

6. An air control damper as claimed in claim 5 including thermal barrier means attached to the upstream side of each said panel whereby to resist transfer of heat therethrough and prolong the fire rating of the damper.

* * * * *